US009611674B2

(12) United States Patent
Cox et al.

(10) Patent No.: US 9,611,674 B2
(45) Date of Patent: Apr. 4, 2017

(54) DOOR LATCH INTERLOCK FOR A LINED BULK MATERIAL CONTAINER

(71) Applicants: C. Anthony Cox, Colleyville, TX (US); James A. Austin, Fort Worth, TX (US)

(72) Inventors: C. Anthony Cox, Colleyville, TX (US); James A. Austin, Fort Worth, TX (US)

(73) Assignee: ConeCraft, Inc., Fort Worth, TX (US)

( * ) Notice: Subject to any disclaimer, the term of this patent is extended or adjusted under 35 U.S.C. 154(b) by 665 days.

(21) Appl. No.: 14/032,781

(22) Filed: Sep. 20, 2013

(65) Prior Publication Data

US 2015/0083614 A1 Mar. 26, 2015

(51) Int. Cl.

| | |
|---|---|
| ***B64D 11/00*** | (2006.01) |
| ***E05B 65/00*** | (2006.01) |
| ***B65D 90/10*** | (2006.01) |
| ***E05B 17/20*** | (2006.01) |
| ***E05B 51/02*** | (2006.01) |
| ***E05C 9/04*** | (2006.01) |
| *E05B 55/00* | (2006.01) |
| *E05C 1/08* | (2006.01) |
| *B65D 90/22* | (2006.01) |
| *E05B 63/22* | (2006.01) |
| *B65D 90/00* | (2006.01) |
| *E05C 19/02* | (2006.01) |

(52) U.S. Cl.

CPC ............ *E05B 65/001* (2013.01); *B65D 90/10* (2013.01); *E05B 17/2038* (2013.01); *E05B 51/02* (2013.01); *E05C 9/043* (2013.01); *B65D 90/008* (2013.01); *B65D 90/22* (2013.01); *E05B 55/00* (2013.01); *E05B 63/22* (2013.01); *E05C 1/08* (2013.01); *E05C 19/028* (2013.01); *Y10T 292/097* (2015.04)

(58) Field of Classification Search

CPC ........ E05B 55/00; E05B 65/001; E05B 63/22; E05B 17/2038; E05B 51/02; B65D 90/10; B65D 90/008; B65D 90/22; E05C 9/043; E05C 1/08; E05C 19/028; Y10T 292/097

USPC ........ 220/495.06; 206/1.5; 292/164; 222/23, 222/49, 50

See application file for complete search history.

(56) References Cited

U.S. PATENT DOCUMENTS

| | | | |
|---|---|---|---|
| 2,937,831 | A | 1/1956 | Mayo et al. |
| 3,486,782 | A | 12/1969 | Zanussi |

(Continued)

*Primary Examiner* — Fenn Mathew
*Assistant Examiner* — Elizabeth Volz
(74) *Attorney, Agent, or Firm* — Dan Brown Law Office; Daniel R. Brown

(57) ABSTRACT

An interlock assembly for a door latch mechanism of a door in a container for bulk material that has an interior lined with a membrane for holding fluid. The interlock assembly includes a plunger in an aperture formed through the door, which moves between an extended position, where the plunger extends into the interior of the container, and a locked position, where the plunger is urged outwardly from of the interior of the container. A spring is positioned to apply a force to urge the plunger to the extended position. A lock member is connected to move with the plunger between the extended position and the locked position. The spring force is selected to enable the membrane, under static pressure of fluid within the container, to urge the plunger to the locked position, thereby engaging the lock member to interlock against operation of the door latch.

20 Claims, 5 Drawing Sheets

(56) References Cited

U.S. PATENT DOCUMENTS

| | | | | |
|---|---|---|---|---|
| 3,785,004 | A * | 1/1974 | Stoffregen | E05C 17/085 16/49 |
| 4,011,686 | A | 3/1977 | Jett, III et al. | |
| 4,799,383 | A * | 1/1989 | Johnson | G01F 23/161 116/227 |
| 5,088,323 | A * | 2/1992 | Johnson | G01F 23/0007 116/227 |
| 6,749,235 | B1 | 6/2004 | Crisp | |
| 8,181,515 | B2 * | 5/2012 | Stephens | G01F 23/0007 73/290 R |
| 2003/0116978 | A1 * | 6/2003 | Crisp | B64D 11/00 292/317 |

* cited by examiner

DOOR LATCH INTERLOCK FOR A LINED BULK MATERIAL CONTAINER

BACKGROUND OF THE INVENTION

Field of the Invention

The present invention relates to door latch interlock mechanisms. More particularly, the present invention relates to door latch interlock mechanisms useful in conjunction with rigid containers having flexible liners for storing or processing liquids or other fluid materials.

Description of the Related Art

Storage and processing containers are in widespread use in various industries and other endeavors. Many of these are used to contain liquids and other flowable bulk materials, such as powders and granular materials. While containing many types of fluid materials, it is preferable to line the container with a polymeric membrane so that the bulk material is either impermeably contained in a suitable polymeric material, or to insure that the bulk materials does not contact the container itself. For example, in the case of pharmaceutical and food grade materials, a polymeric liner, such as PVC or polypropylene, may be used to maintain the purity and cleanliness of the bulk material. In other instances, the bulk material may react with a storage container itself, so a polymeric liner is used to prevent such reactions.

Even though such storage and process containers may be lined, it is still necessary to access the interior of cleaning and service. For this reason, such containers may be equipped with doors large enough for workers to access the interior. In fact, such doors may be the access port through which polymeric liners are installed. It is necessary to securely latch the doors in a closed position when they are not in use. Particularly when the container is filled with a fluid material since the static pressure produced under the force of gravity generates a substantial opening force against the interior of the door. Herein lies a risk of such designs. If the door were intentionally or inadvertently opened while the lined container was full of a fluid material, then the static pressure would push the liner outwardly through the door opening. In fact, the liner may rupture, allowing the fluid material to flow out of the container. Thus it can be appreciated that there is a need in the art for an apparatus for mitigating the potential risk of opening such a door while there is fluid in the process container.

SUMMARY OF THE INVENTION

The need in the art is addressed by the teaching of the present disclosure. The present disclosure teaches an interlock assembly for a door latch mechanism of a door in a container for bulk material that has an interior lined with a membrane for holding fluid. The interlock assembly includes a plunger located within an aperture formed through the door, which moves between an extended position, where the plunger extends into the interior of the container, and a locked position, where the plunger is urged outwardly from of the interior of the container. A spring is positioned to apply a force to urge the plunger to the extended position. A lock member is connected to move with the plunger between the extended position and the locked position. The spring force is selected to enable the membrane, under static pressure of fluid within the container, to urge the plunger to the locked position, thereby engaging the lock member to interlock against operation of the door latch.

In a specific embodiment of the foregoing assembly, where the door latch mechanism includes a latch bar that engages a door frame in the bulk material container, the lock member interferes with movement of the door latch mechanism, which interferes with movement of the lock bar while the lock member is at the locked position. In a refinement to this embodiment, a stop member is fixed to the door latch mechanism, and is positioned to engage the lock member while the lock member is at the locked position.

In a specific embodiment of the foregoing assembly, the container is a food grade or pharmaceutical grade process bin, and the membrane is an impermeable liner for the process bin. In another embodiment, the membrane is a replaceable polymeric liner.

In a specific embodiment of the foregoing assembly, the plunger is fabricated from a polymeric material. In another embodiment, the plunger has a distal face portion that engages the membrane, and the distal face portion is smooth and rounded to reduce possible damage to the membrane.

In a specific embodiment of the foregoing assembly, the spring is selected from a compression spring and a tension spring. In another embodiment, the spring couples the force to the plunger through a linkage, and the linkage may be a lever.

In a specific embodiment of the foregoing assembly, the plunger and the lock member are rigidly connected, and are movable in unison. In another embodiment, the plunger and the lock member are connected by a linkage, which may be through a pivot.

The present disclosure also teaches a membrane lined bulk material container with an interlocked door opening, which includes a container for bulk material that includes a side wall, and a membrane that holds fluid disposed within the interior of the container. A door is located in the side wall, and there is a door latch mechanism that latches the door at a closed position. An interlock assembly is used, which comprises a plunger disposed within an aperture formed through the door, that moves between an extended position, wherein the plunger extends into the interior of the container, and a locked position, wherein the plunger is urged outwardly from of the interior of the container. There is also a spring arranged to apply a force to urge the plunger to the extended position. A lock member is coupled to move with the plunger between the extended position and the locked position, and the force of the spring is selected to enable the membrane, under static pressure of fluid within the container, to urge the plunger to the locked position thereby engaging the lock member to interlock against operation of the door latch.

In a specific embodiment of the foregoing container, the door latch mechanism includes a latch bar that engages a door frame in the side wall, and the lock member interferes with movement of the door latch mechanism, thereby interfering with movement of the lock bar while the lock member is at the locked position. In a refinement to this embodiment, a stop member is fixed to the door latch mechanism, and it is positioned to engage the lock member while the lock member is at the locked position.

In a specific embodiment of the foregoing container, the membrane is a replaceable polymeric liner.

In a specific embodiment of the foregoing container, the plunger is fabricated from a polymeric material. In another embodiment, the plunger has a distal face portion that engages the membrane, and the distal face portion is smooth and rounded to reduce possible damage to the membrane.

In a specific embodiment of the foregoing container, the plunger and the lock member are rigidly connected, and are movable in unison.

DESCRIPTION OF THE INVENTION

Figure 1:
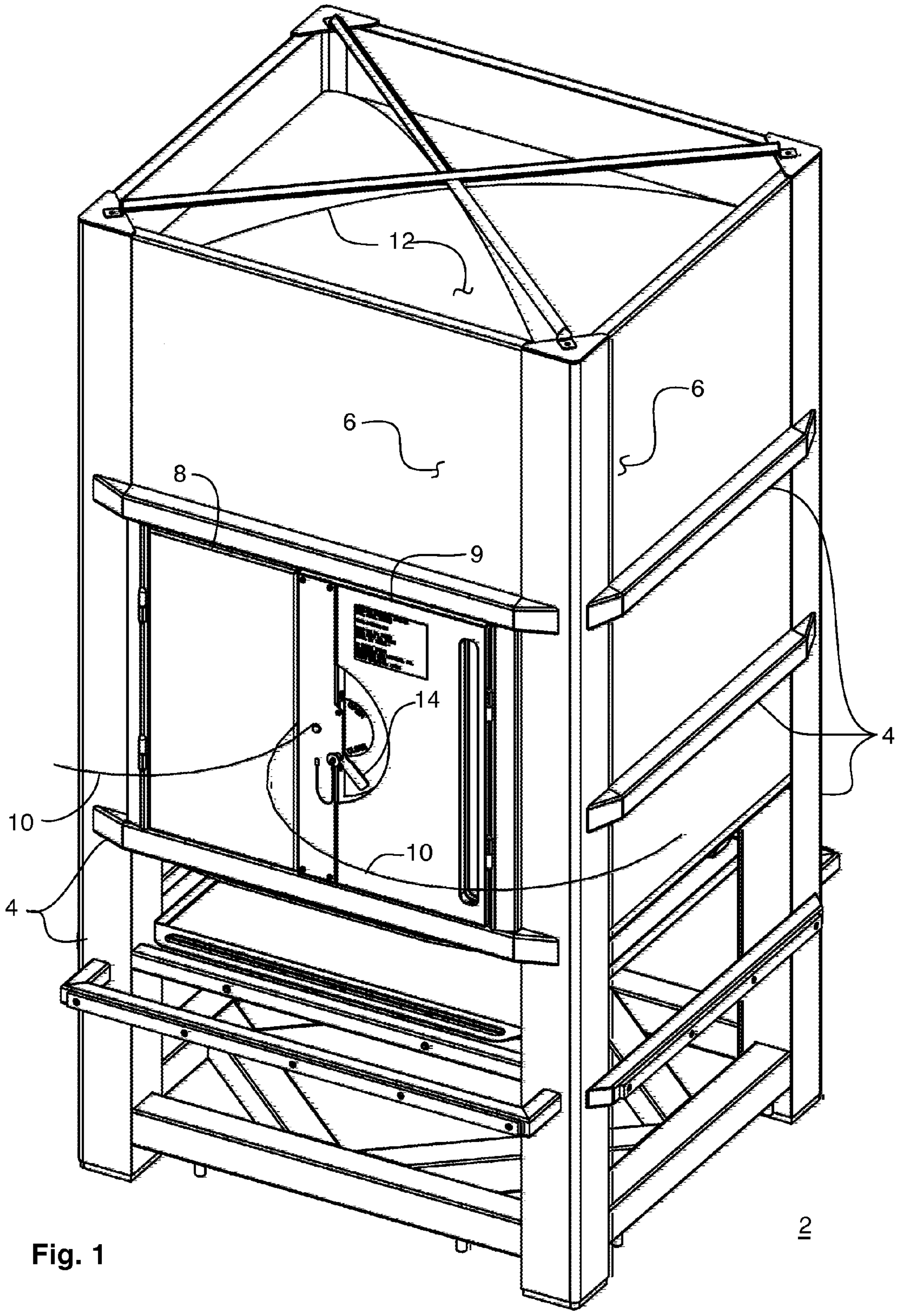
FIG. 1 is a perspective view drawing of a process container according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

An illustrative embodiment of the present invention is applied to the pharmaceutical industry, and in particular, processing bins that employ polymeric liners to impermeably retain a fluid content, which is commonly a liquid. Such processing and storage bins are commonly fabricated from stainless steel, for the benefits of corrosion resistance, cleanliness, and durability. As such, these bins are opaque and the contents are concealed from view. Thus, operators of such equipment may not know the extent to which such containers are filled. Also note that the polymeric liners are generally flexible bag-like structures that can be replaced from time to time. For this and other reasons, the exterior walls of such containers may have doors installed for access to the interior. Such doors contain the polymeric liner in the same fashion as the walls. Given that the container is opaque and that the doors can be opened by operators, care must be exercised not to open the door if a substantial amount of fluid is in the container. The interlock assembly of the present disclosure alleviates the risk of opening the doors while the container has a substantial amount of fluid therein.

Reference is directed to FIG. 1, which is a perspective view drawing of a liquid container 2 according to an illustrative embodiment of the present invention. This container 2 is an example of a fluid storage bin suitable for use in pharmaceutical processing and storage. The container 2 is fabricated with an exterior frame 4, which comprises plural stainless steel structural shapes, such as rectangular tubing and angle iron shapes. The walls 6 are commonly fabricated from stainless steel sheet or plate stock. As such, the interior of the container 2 is smooth and suitable from housing a polymeric bag-type liner 12 without risk for damage or puncture. This exemplary processing bin 2 comprises a pair of access doors 8, 9 that swing open 10 for access to the interior of the bin 2. The top of a polymeric bag 12 is visible at the open top of the container 2. As the polymeric liner 12 is filled and emptied, the unfilled portion of the polymeric bag moves upwardly and downwardly with the level of the liquid contained therein. Of course, the static pressure of the liquid displaces the polymeric liner 12 firmly against the walls 6 of the bin 2, as well as against the inside of the doors 8, 9. The doors 8, 9 are latched in a closed position using latch handle 14 on door 9. Door 8 is retained in the closed position by door 9.

Figure 2:
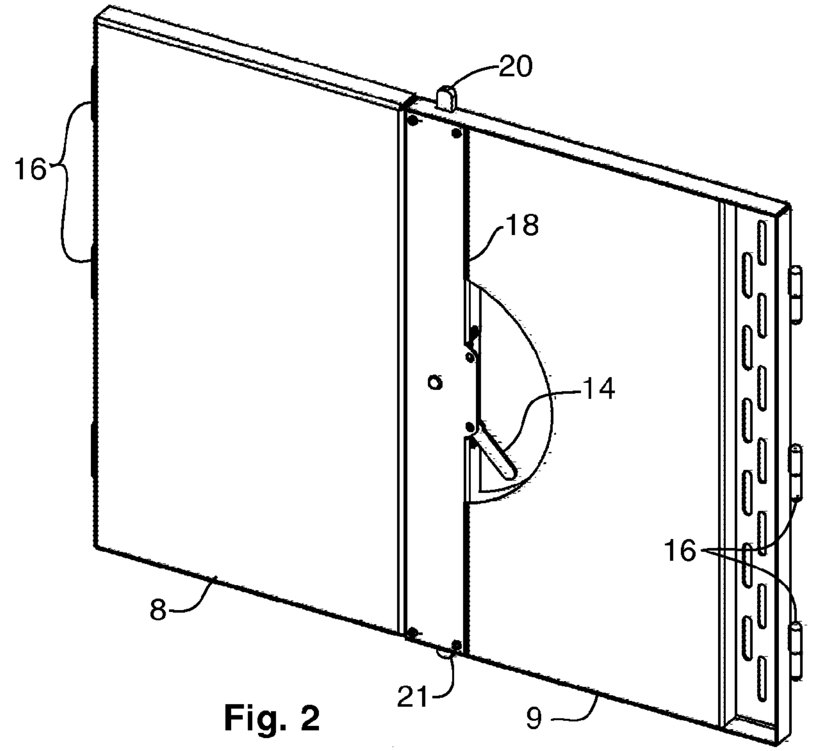
FIG. 2 is an exterior view of container doors according to an illustrative embodiment of the present invention.

Reference is directed to FIG. 2, which is an exterior view of container doors 8, 9 according to an illustrative embodiment of the present invention. This detailed view illustrates further details about the doors 8, 9 used in the container 2 (not shown in this view). The doors 8, 9 are attached using plural hinges 16 so that they may swing open and out of the way for access. A latch handle 14 is coupled to a door latch mechanism that ultimately controls an upper and a lower latch bar 20, 21 that engage a door frame (not shown) to retain the doors 8, 9 in the closed position. A cover plate 18 is placed over the door latch mechanism of the door, exposing only the latch handle 14 for operations by an operator.

Figure 3:
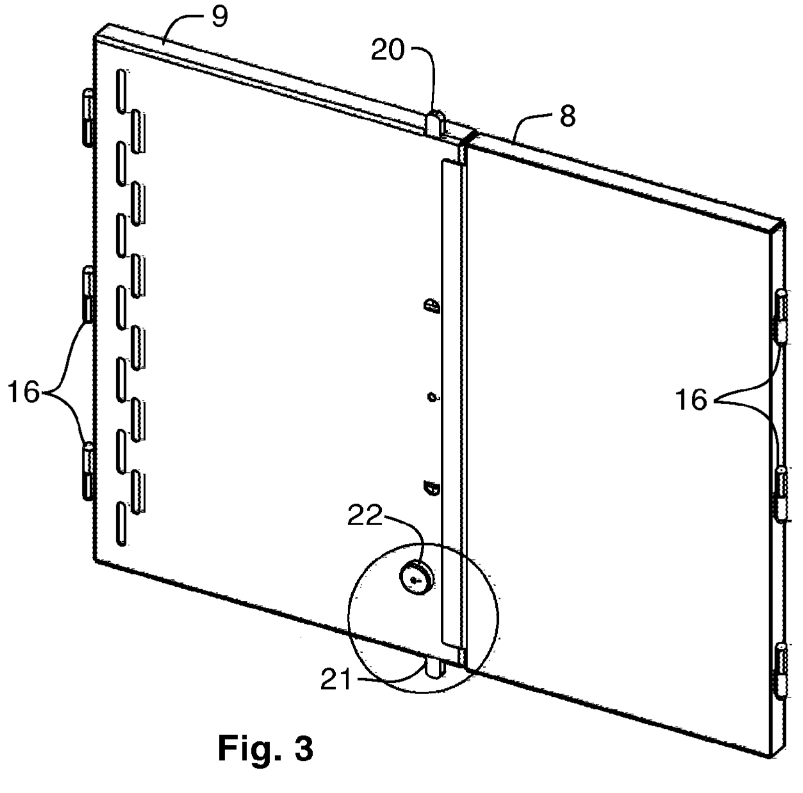
FIG. 3 is an interior view of container doors according to an illustrative embodiment of the present invention.

Reference is directed to FIG. 3, which is an interior view of container doors 8, 9 according to an illustrative embodiment of the present invention. The latch bars 20, 21 are visible as well as the aforementioned hinges 16. Note that on the interior of door 9 there is a plunger 22 that extends into the interior side of the door 9. This plunger 22 is actuated by force of the fluid in the container (not shown), and interacts with the door latch mechanism to interlock the movement of the latch bars 20, 21. This arrangement will be more fully discussed hereinafter.

Figure 4:
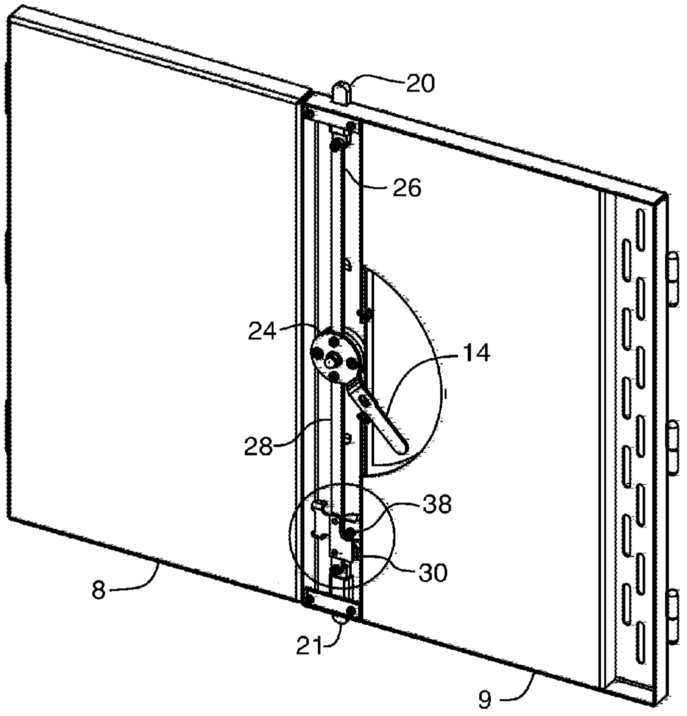
FIG. 4 is an interior view of container doors showing an interlock assembly according to an illustrative embodiment of the present invention.

Reference is directed to FIG. 4, which is an interior view of container doors 8, 9 showing the door latch mechanism and interlock assembly according to an illustrative embodiment of the present invention. In this view, the cover plate (item 18 in FIG. 3) has been removed, thereby exposing the door latch mechanism and the parts of the interlock assembly. The latch handle 14 is connected to a pivot plate 24 such that a ninety degree rotations of the latch handle 14 causes an upper latch link 26 and a lower latch link 28 to cycle in the fashion of a connecting rod, and drive a upper latch bar 20 and a lower latch bar 21 inwardly and outwardly from the edge of the door 9. The latch bars 20, 21 engage corresponding slots in the door frame (not shown) and retain the door 9 in a closed position. Door 8 is retained by and overlapping edge (not shown) with door 9. The interlock assembly includes a stop member 30 that is fixed to the lower latch link 28, and a lock member 38, which engages the stop member 30 to interfere with the latch bar 21 being retracted into door 9. In the illustrative embodiment, the lock member 38 is a shaft like extension and the stop member 30 is a plate like structure. Other structures could also be employed, provided that the lock member would interfere with the opening operations of the door latch mechanism. The lock member could also be attached to other components in the door latch mechanism, such as the latch bars 20, 21, the pivot 24, or the latch handle 14. The lock member 30 could also be an integral portion of the door latch assembly itself.

Figure 5:
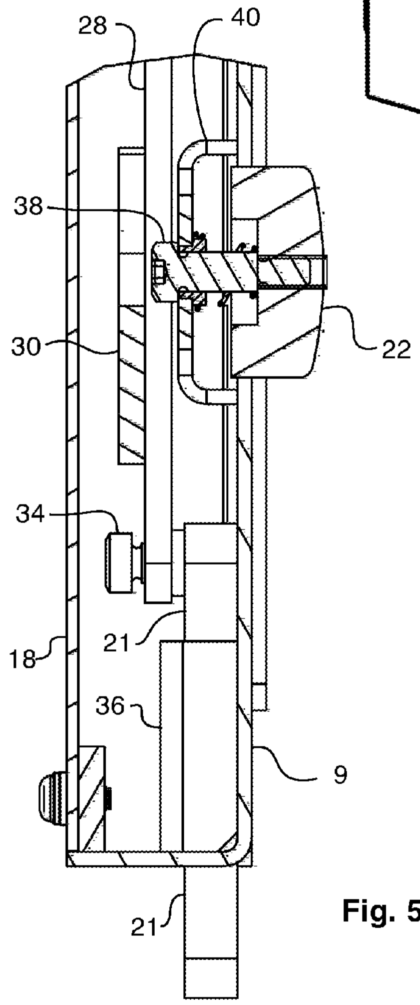
FIG. 5 is a section view drawing of the interlock assembly according to an illustrative embodiment of the present invention.

Reference is directed to FIG. 5, which is a section view drawing of the door 9 at the interlock assembly according to an illustrative embodiment of the present invention. The door 9 has a cover plate 18 in place to enclose the various components of the door latch mechanism and the interlock assembly. In particular, the door latch mechanism includes the lower latch link 28, which is connected to the lower latch bar 21 by a pin 34. A linear guide 36 directs the latch bar 21 along a linear path. The stop member 30 is fixed to the lower latch link 28. The interlock assembly further includes a plunger 22 and a lock member 38, which are supported by a frame 40 attached to the door 9. The plunger 22 extends into the interior of the container so that the liner (not shown) can be urged against it by the fluid contents of the container.

Figure 6:
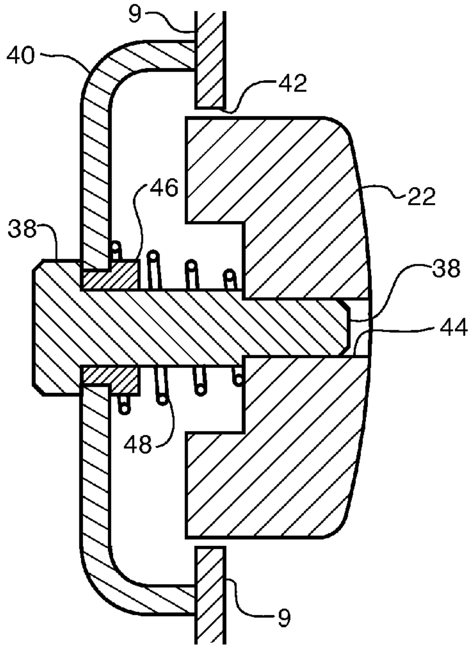
FIG. 6 is a section view drawing of an interlock plunger assembly according to an illustrative embodiment of the present invention.

Reference is directed to FIG. 6, which is a section view drawing of an interlock assembly according to an illustrative embodiment of the present invention. The door 9 serves as the host for the interlock assembly, and there is a round aperture 42 formed through the door 9 to accomplish this. A formed metal frame 40 is fixed to the door 9 about the aperture 42. The frame 40 supports a guide bushing 46, which supports a shoulder bolt 38. The guide bushing may be a suitable polymeric material, such as Nylon, Delrin, UHMW poly, or a metallic material such as sintered bronze. The shoulder portion of the shoulder bolt 38 glides through the bushing 46. The head of the shoulder bolt 38 serves as the lock member, which engages the stop member (not shown) attached to the door latch mechanism (not shown). The threaded portion of the shoulder bolt 38 threadably engages a hole 44 formed in a plunger 22. The plunger 22 is formed from a suitable polymeric material. The plunger 22 is cylindrical in form with a rounded, arcuate face at the distal end, which might be referred to as a button shape. This shape presents a smooth surface to the liner (not shown) in the container (not shown). A conical spring 48 is disposed between the frame 40 and the plunger 22, and serves to urge the plunger 22 outwardly from the interior surface of the door 9.

Figure 7:
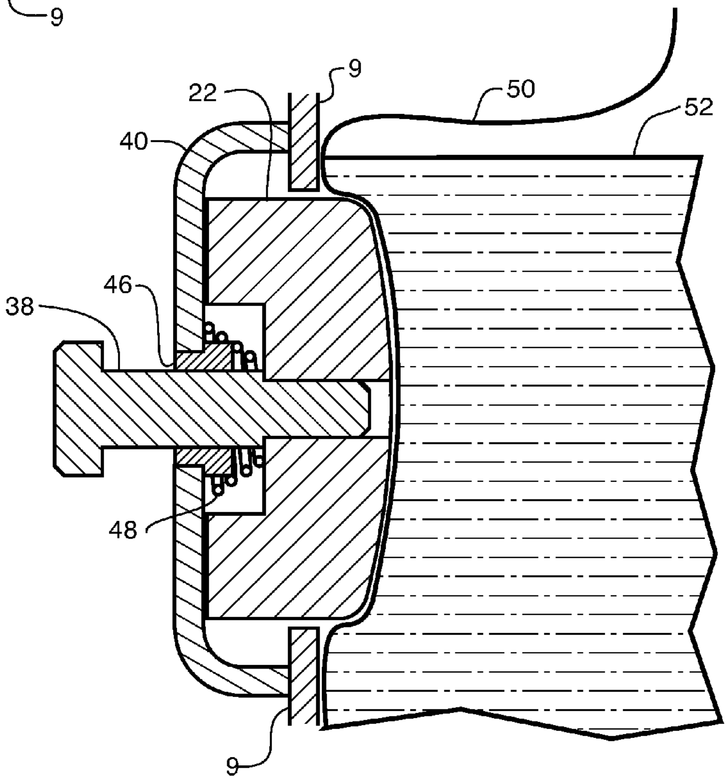
FIG. 7 is a section view drawing of an interlock plunger assembly according to an illustrative embodiment of the present invention.

Reference is directed to FIG. 7, which is a section view drawing of an interlock plunger assembly according to an illustrative embodiment of the present invention. FIG. 7 corresponds to FIG. 6, however, FIG. 7 includes the liner 50 and a quantity of liquid 52 therein. The static pressure of the liquid 52 presses the liner 50 against the plunger 22. The force of the spring 48 is selected such that the liquid pressure overcomes the spring 48 force and urges the plunger outwardly from the interior side of the door 9. This also pushes the should bolt 38 outwardly through the guide 46. When the liquid level 52 drops, the spring 48 urges the plunger 22 back into the interior.

Figure 8:
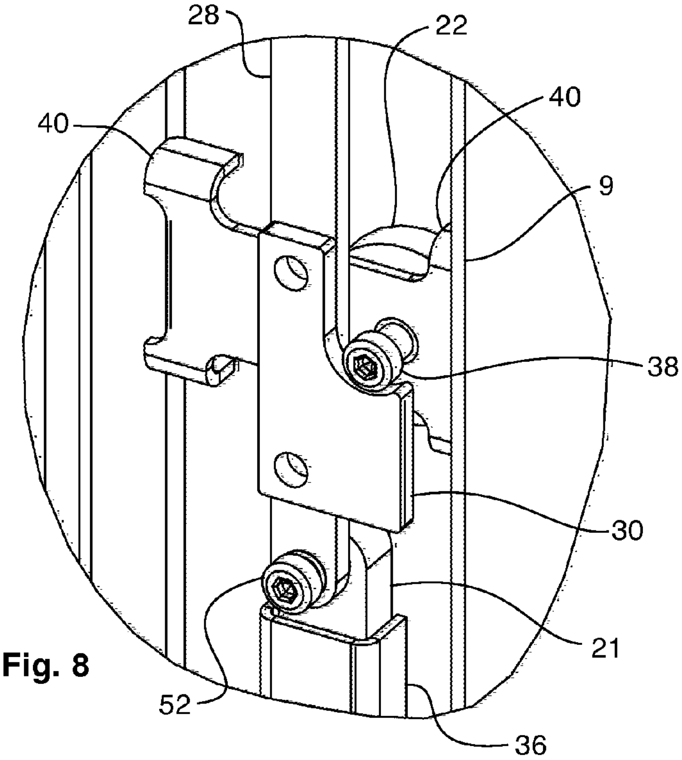
FIG. 8 is a detail view drawing of an interlock assembly according to an illustrative embodiment of the present invention.
Figure 9:
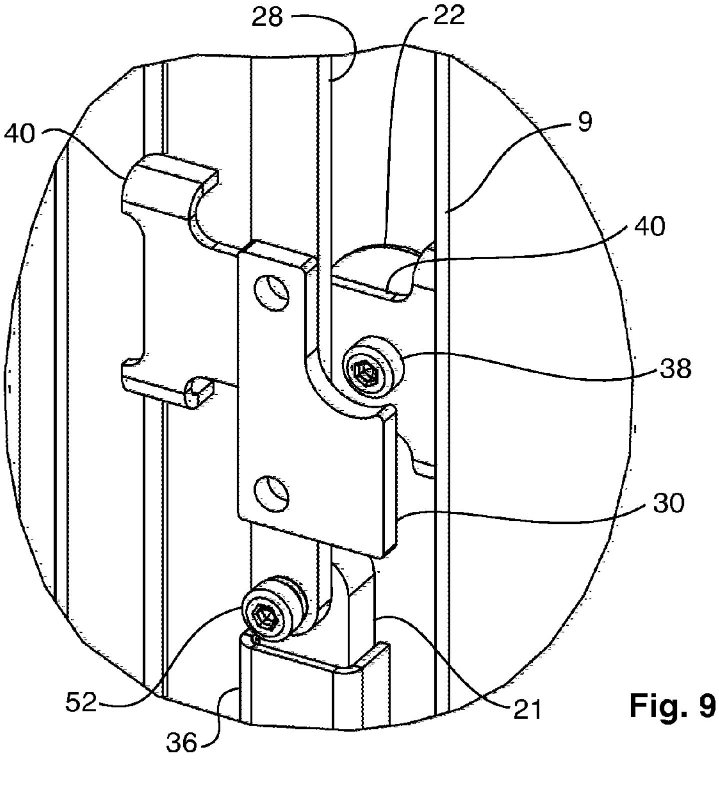
FIG. 9 is a detail view drawing of an interlock assembly according to an illustrative embodiment of the present invention.

Reference is directed to FIG. 8 and FIG. 9, which are detailed view drawings of an interlock assembly according to an illustrative embodiment of the present invention. FIG. 8 illustrates the interlock assembly in the locked position, and FIG. 9 illustrates the interlock assembly in the unlocked position. A stop member 30 is fixed to the lower latch link 28. The lower latch link 28 is connected by a pin 52 to the lower latch bar 21, which passes through guide 36. The plunger 22 can be seen, as well as the frame 40 and the lock member 38, which is the head of a shoulder bolt in this embodiment. In FIG. 10, the plunger 22 and lock member 38 are urged toward the interior of the door 9, so the stop member is free to move upwardly so that the door may be opened. On the other hand, in FIG. 9, the plunger and lock member have been urged outwardly so that the lock member 38 interferes with movement of the stop member 30, and the door latch mechanism cannot be moved to the open door position. Thusly, the door latch mechanism is interlock from opening while liquid in the lined container is present at the location of the plunger 22.

Note that the illustrative embodiment employs a shoulder bolt as the lock member and as the connecting link between the plunger and the lock member. This arrangement is not a require feature. The lock member and the plunger could be coupled through linked lever and a pivot, or through a cam and follower arrangement. Those skilled in the art will appreciate that the movement of the plunger and the position of the lock member could be linked in a variety of ways. So long as the plunger movement results in the interference with the door latch mechanism, then the assembly will function as intended.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An interlock assembly for a door latch mechanism of a door in a container for bulk material that has an interior lined with a membrane for holding fluid, said interlock assembly comprising:

a plunger disposed within an aperture formed through the door, and movable between an extended position, wherein said plunger extends into the interior of the container, and a locked position, wherein said plunger is urged outwardly from of the interior of the container;

a spring arranged to apply a force to urge said plunger to said extended position;

a lock member coupled to move with said plunger between said extended position and said locked position, and wherein said force is selected to enable the membrane, under static pressure of fluid within the container, to urge said plunger to said locked position thereby engaging said lock member to interlock against operation of the door latch.

2. The assembly of claim 1, wherein the door latch mechanism includes a latch bar that engages a door frame in the bulk material container, and wherein:

said lock member interferes with movement of the door latch mechanism, thereby interfering with movement of the latch bar while said lock member is at said locked position.

3. The assembly of claim 2, further comprising:

a stop member fixed to the door latch mechanism, and positioned to engage said lock member while said lock member is at said locked position.

4. The assembly of claim 1, and wherein the membrane is a replaceable polymeric liner.

5. The assembly of claim 1, and wherein:

said plunger is fabricated from a polymeric material.

6. The assembly of claim 1, and wherein:

said plunger comprises a distal face portion for engaging the membrane, and wherein said distal face portion is smooth and rounded to reduce possible damage to the membrane.

7. The assembly of claim 1, and wherein:

said spring is selected from a compression spring and a tension spring.

8. The assembly of claim 1, and wherein:

said spring couples said force to said plunger through a linkage.

9. The assembly of claim 8, and wherein:

said linkage is a lever.

10. The assembly of claim 1, and wherein:

said plunger and said lock member are rigidly connected, and are movable in unison.

11. The assembly of claim 1, and wherein:

said plunger and said lock member are connected by a linkage.

12. The assembly of claim 1, and wherein:

said plunger and said lock member are connected through a pivot.

13. The assembly of claim 1, and wherein the container is a food grade or pharmaceutical grade process bin, and the membrane is an impermeable liner for the process bin.

14. A membrane lined bulk material container with an interlocked door opening, comprising:

a container for bulk material that includes a side wall;

a membrane for holding fluid disposed within the interior of said container;

a door disposed in said side wall;

a door latch mechanism disposed to latch said door at a closed position;

an interlock assembly, further comprising;

a plunger disposed within an aperture formed through the door, and movable between an extended position, wherein said plunger extends into the interior of the container, and a locked position, wherein said plunger is urged outwardly from of the interior of the container;

a spring arranged to apply a force to urge said plunger to said extended position;

a lock member coupled to move with said plunger between said extended position and said locked position, and wherein said force is selected to enable the membrane, under static pressure of fluid within the container, to urge said plunger to said locked position thereby engaging said lock member to interlock against operation of the door latch.

15. The assembly of claim 14, and wherein:

said door latch mechanism includes a latch bar that engages a door frame in said side wall, and wherein said lock member interferes with movement of the door latch mechanism, thereby interfering with movement of the lock bar while said lock member is at said locked position.

16. The assembly of claim 15, further comprising:

a stop member fixed to the door latch mechanism, and positioned to engage said lock member while said lock member is at said locked position.

17. The assembly of claim 14, and wherein the membrane is a replaceable polymeric liner.

18. The assembly of claim 14, and wherein:

said plunger is fabricated from a polymeric material.

19. The assembly of claim 14, and wherein:

said plunger comprises a distal face portion for engaging the membrane, and wherein said distal face portion is smooth and rounded to reduce possible damage to the membrane.

20. The assembly of claim 14, and wherein:

said plunger and said lock member are rigidly connected, and are movable in unison.

* * * * *